Oct. 16, 1951  F. F. AGUDO  2,571,327
FAUCET
Filed Nov. 12, 1947

INVENTOR.
FRANCISCO FERNANDEZ AGUDO
BY
Kenyon & Kenyon
ATTORNEYS

Patented Oct. 16, 1951

2,571,327

UNITED STATES PATENT OFFICE 2,571,327

FAUCET

Francisco Fernández Agudo, Madrid, Spain

Application November 12, 1947, Serial No. 785,349

1 Claim. (Cl. 251—8)

This invention relates to faucets or faucet valves, and more particularly to a new type of faucet which is highly efficient in operation and which is of simplified and inexpensive construction.

Heretofore faucets usually have included a casing, a valve seat, a cooperating valve member, and an operating handle for working the valve member, the handle extending through a portion of the casing and being packed or surrounded with packing material to prevent the water or other fluid from leaking around the stem of the handle.

The faucet of the present invention consists of only two elements, namely, a faucet body in which a valve seat member is provided, and a mouth piece threadedly engaged with the faucet body and having a valve member therein. No separate operating handle, stem or packing material is required, and the new faucet is constructed in such a manner that it is highly efficient in operation, is subject only to slight wear, comprises a minimum number of parts, provides a fluid stream free of splash, and is not subject to leaking. A further advantage of the present invention lies in the provision of a simple, efficient faucet, which can be manufactured from relatively inexpensive materials, such as inexpensive metal alloys, glass, or plastic materials, or combinations thereof. Furthermore, the two elements of this faucet are designed and constructed so that they may be made entirely by molding or casting procedures, and so as to require no subsequent machining operations.

In a fluid control faucet according to this invention the faucet body comprises a short section of pipe having at one end means, such as screw threads or a union, for coupling it to a piping system. The other end of the pipe section is provided with a nozzle portion which may be formed by curving or forming such end of the pipe at an angle to the principal longitudinal axis of the pipe. A valve seat member is provided within the nozzle portion of the pipe section, as by forming an integral valve seat therein, or by utilizing an insert which may be press-fitted or otherwise secured within the nozzle portion of the pipe.

The mouth piece of the faucet, having a valve member supported thereby, is threadedly engaged with the nozzle end of the faucet body, and the valve member of the mouth piece is disposed in cooperative relation to the valve seat member in the faucet body so as to shut-off or open, or otherwise regulate the flow or fluid through the faucet as the valve member is moved relative to the valve seat member by rotating the mouth piece on the threads provided on the nozzle portion of the faucet body.

The mouth piece is provided advantageously with ribs, wings or the equivalent for facilitating the turning of the mouth piece on the nozzle threads; and retaining means, such as a buffer pin or a spring ring is advantageously interposed between the nozzle and the mouth piece, to prevent the latter from being threaded off the faucet body accidentally.

In the accompanying drawing which illustrates several embodiments of the invention:

Figure 1:
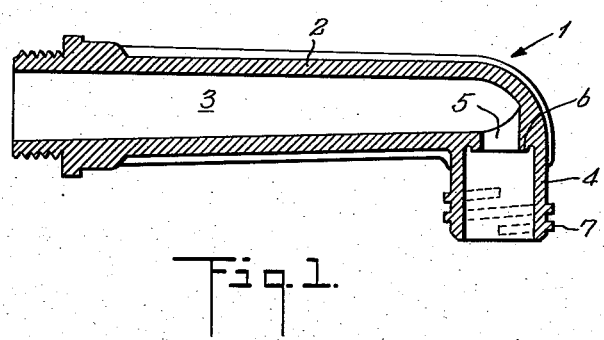
Fig. 1 is a longitudinal sectional view of a faucet body provided with an integral valve seat member.

Referring to the drawing, the faucet body 1 comprises a pipe section 2 which is provided with a fluid passage 3 terminating above a depending nozzle portion 4 in a chamber which is closed except for a fluid exit passage 5. This passage is disposed, for example, substantially at right angles to the longitudinal axis of passage 3 and the principal axis of passage 5 coincides with the axis of the depending nozzle portion 4. A ledge formed by the walls of the pipe section around the passage 5 provides a valve seat 6. The interior of the nozzle portion of the pipe is somewhat larger than the valve seat for permitting a valve member to move therein relative thereto. Threads 7 are provided on the exterior surface of the nozzle portion 4.

Figure 2:
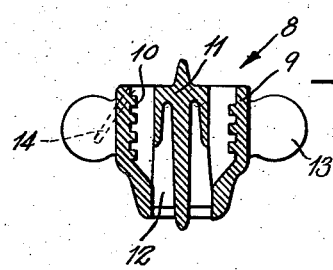
Fig. 2 is a central vertical sectional view of a mouth piece provided with an integral valve member.
Figure 3:
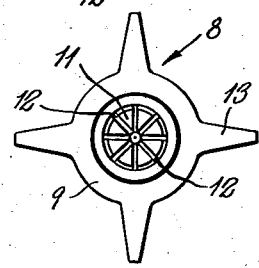
Fig. 3 is a bottom view of the entire mouth piece of which only a section is shown in Fig. 2.

A mouth piece or valve body 8, such as shown in Figs. 2 and 3, comprises a cylindrical shell 9 provided on the internal surface thereof with threads 10 which are adapted to cooperate with the threads 7 on nozzle portion 4 for threading the mouth piece onto the faucet body. The mouth piece carries a valve member 11 disposed centrally within shell 9 and having the upper portion thereof separated from the shell so as to permit the nozzle 4 to be accommodated between the shell and the valve member. The valve member 11 is supported within shell 9 for cooperative engagement with the valve seat 6 as the mouth piece is threaded up onto nozzle 4. This valve member is connected to and supported within shell 9 by means of several thin fins or partitions 12 which are formed integrally with shell 9 and valve member 11, and the lower ends of these partitions are beveled on both sides so as to minimize resistance to flow of fluid out of the mouth piece.

The upper surface of valve member 11 distributes the fluid around the sides thereof into the several passages provided in the mouth piece by the partitions 12, and the latter minimize the turbulence of the fluid in the mouth piece and discharge the several streams of the fluid in a substantially uniform single direction. The lower portion of shell 9 is also cylindrical in form, but is tapered inwardly so that the exit end of the mouth piece has an internal diameter not larger, and advantageously somewhat smaller, than that of the nozzle portion 4; and the diameter of the upper surface of valve member 11 is advantageously somewhat smaller than the internal diameter of the exit end of the mouth piece, but is sufficiently large to provide an effective valve surface for cooperation with valve seat 6. Due to the difference in diameters of the exit end of the mouth piece, the valve member, and the nozzle portion of the faucet body, a liquid cushion is produced within the mouth piece when the latter is positioned to permit fluid to flow through passage 5, thus providing a smoothly flowing stream as the fluid leaves the mouth piece and also avoiding reflux of liquid through the threads in the mouth piece and on the nozzle end of the faucet body. Since the threads of the mouth piece and nozzle are thus not submerged in fluid, deposition thereon of contaminants in the fluid is avoided, thereby increasing the useful life of the faucet.

Gripping means, such as wings 13 are also formed integrally with shell 9 for assisting in turning the mouth piece relative to nozzle portion of the faucet body.

As shown in Fig. 2, a buffer pin or wire 14 is disposed within a recess formed in one of the wings 13, and with its upper end positioned so as to engage firmly a portion of the threads on nozzle 4 as the mouth piece is rotated relative thereto. By providing this buffer pin, accidental or involuntary dismounting of the mouth piece from the faucet body is prevented, while at the same time, the mouth piece may be rotated relative to the nozzle portion of the faucet body.

Figure 4:
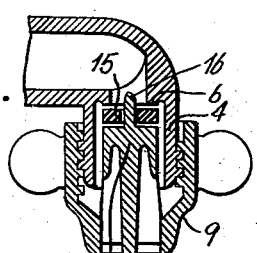
Fig. 4 is a central vertical sectional view of a portion of an assembled faucet body and mouth piece, the elements of which are shown in Figs. 1 and 2.

As shown in Fig. 4, a washer 15 of rubber or other suitable material, may be disposed around an upwardly projecting tip 16 of the valve member 11 so as to engage the valve seat 6 as the valve member is moved upwardly toward the valve seat by rotation of the mouth piece 8 relative to nozzle 4.

Figure 5:
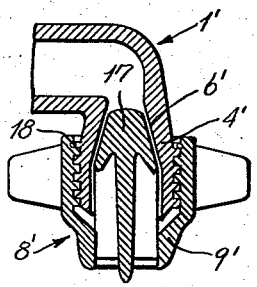
Fig. 5 is a central vertical sectional view of a portion of a modification of an assembled faucet body and mouth piece.

In Fig. 5 a modified form of a valve member which may be formed integrally with the shell 9' is shown at 17. The upper lateral surfaces of this valve member are substantially conical in form, and the valve seat 6' provided within the nozzle portion 3' of faucet body 1' is of corresponding conical form so that the valve member 17 will cooperate therewith to shut-off or open the flow of fluid through the faucet body as the mouth piece is rotated relative to nozzle portion 4'. In this embodiment of the invention no washer such as that shown at 15 in Fig. 4 is required, due to conical shape of the valve member and valve seat. To prevent accidental displacement of the mouth piece 8' from the faucet body, a spring ring 18, as shown in Fig. 5, may be interposed between one of the threads of the mouth piece and the corresponding thread on the nozzle 4'.

From the foregoing description it will be apparent that the elements of a faucet constructed in accordance with this invention, namely, the faucet body and mouth piece, may be manufactured inexpensively by well-known casting or molding methods, with the use of suitable dies. For example, the faucet body 1 may be cast by employing a tapered die to provide the passage 3 and by employing another die fitted against the inner end of the tapered die to provide passage 5, valve seat 6 and the chamber within nozzle 4. Likewise, the mouth piece 8 may be molded by using a hollow threaded die to provide the space between the shell 9 and the valve member 11, and by using another die to provide the passages between partitions 12.

Figure 6:
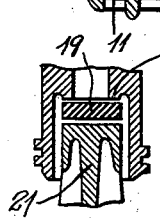
Fig. 6 is a partial central vertical sectional view of one modification of a valve member and cooperating valve seat member.

In the modification of the valve member and washer assembly shown in Fig. 6, the washer 19 is disposed freely between the valve seat 20 and the top of valve member 21. This arrangement minimizes the wear on the washer 19 inasmuch as different portions of the washer are pressed against the valve seat during successive closings of the valve.

Figure 7:
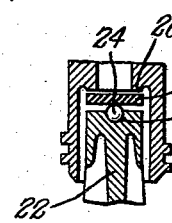
Fig. 7 is a partial central vertical sectional view of another modification of a valve member and cooperating valve seat member.

In the modification of the washer and valve member assembly shown in Fig. 7 the upper surface of the valve member 22 is provided with a recess 23 within which a ball or sphere 24 is positioned. The washer 25 rests on the ball 24 and is pressed by the ball against the valve seat 26 as the valve member moves toward the valve seat. This ball-support of the washer minimizes the frictional resistance between the washer and the valve member as the latter is rotated relative to the nozzle of the faucet body.

Figure 8:
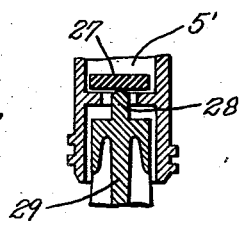
Fig. 8 is a partial central vertical sectional view of another modification of a valve member and cooperating valve seat member.

In the modification of the washer and valve member assembly shown in Fig. 8, the washer 27 is disposed above the valve seat within a chamber formed by the walls of the pipe section above and surrounding passage 5'. The projecting tip 28 of valve member 29 is rounded and is of sufficient length to project through the aperture of the valve seat to engage the under surface of washer 27, so as to raise this washer off the valve seat against which it is normally held by the pressure of the fluid in the faucet body. With this arrangement frictional resistance between the washer and the valve member is minimized as the valve member is rotated relative to the nozzle of the faucet body.

From the foregoing description, it will be apparent that in addition to the advantages pointed out above, this invention provides an efficient faucet valve which is much simplified in construction as compared with previously known faucets, but which has all the strength required of a faucet. This new faucet has approximately only one-half the volume of previously known faucets, and accordingly, is only about one-half as heavy as previous faucets. Replacement of washers in faucets costructed according to this invention is extremely simplified, and such faucets are particularly adapted for construction from glass, plastic materials or combinations thereof, in transparent or opaque colored materials which will harmonize with the decorative scheme of the equipment with which they are used. When constructed of such materials, the faucets are entirely free from corrosion and hence more hygienic to use, particularly as in a household water system. For use in the chemical industries, for example, such faucets may also be made inexpensively from plastic materials which are particularly resistant to various conditions of corrosion.

It is to be understood that the invention is not limited to the modifications shown in the accompanying drawing and described with reference thereto, but that other modifications and variations may be made without departing from the invention as defined in the appended claim.

I claim:

In a fluid control faucet, the combination of a faucet body comprising a metal pipe section having at one end and extending at right angles thereto a depending externally threaded nozzle portion provided internally with a valve seat, and a mouthpiece comprising a cylindrical shell internally threaded at an inlet end thereof and thereby threadedly engaged with said nozzle portion of said faucet body, a valve member extending along the entire axis of the shell and having a top surface near said inlet end adapted to be disposed in cooperative relation to said valve seat by rotation of said mouthpiece on said faucet body for regulating the flow of fluid from said faucet body, said valve member having a tip portion projecting from said top surface thereof toward said valve seat for holding a washer on said top surface and said valve member being supported within said shell by a plurality of thin radial partitions extending between said valve member and said shell and longitudinally of said shell to define a plurality of fluid flow passages longitudinally of said mouthpiece, said partitions having their lower edges beveled, gripping wings on the outer surface of said shell for turning the mouthpiece relative to the nozzle portion, the exit end portion of said shell being tapered inwardly in the downward direction to form a fluid exit having a diameter smaller than the diameter of said nozzle portion, the diameter of said valve member being less than said diameter of said exit, and said shell, valve member, partitions, tip portion and gripping wings all being formed as a unitary integral mouthpiece of plastic material.

FRANCISCO FERNÁNDEZ AGUDO.

REFERENCES CITED

The following references are of record in the file of this patent:

UNITED STATES PATENTS

| Number | Name | Date |
|---|---|---|
| 261,065 | Thayer | July 11, 1882 |
| 1,452,967 | Freedman | Apr. 24, 1923 |
| 1,476,527 | Lewis | Dec. 4, 1923 |
| 1,518,367 | Speyer | Dec. 9, 1924 |
| 1,551,758 | Lehr | Sept. 1, 1925 |
| 1,574,200 | Lewis | Feb. 23, 1926 |
| 1,678,927 | Weatherhead | July 31, 1928 |
| 2,019,257 | Gibbs | Oct. 29, 1935 |
| 2,175,718 | Litle | Oct. 10, 1939 |

FOREIGN PATENTS

| Number | Country | Date |
|---|---|---|
| 730,213 | France | of 1932 |
| 766,349 | France | of 1934 |